(12) United States Patent
Ueda et al.

(10) Patent No.: US 8,962,217 B2
(45) Date of Patent: Feb. 24, 2015

(54) FUEL CELL AND ELECTRICITY GENERATION METHOD USING THE SAME

(75) Inventors: Wataru Ueda, Sapporo (JP); Tatsuya Takeguchi, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 549 days.

(21) Appl. No.: 13/054,032

(22) PCT Filed: Jul. 10, 2009

(86) PCT No.: PCT/JP2009/062608
§ 371 (c)(1),
(2), (4) Date: Mar. 3, 2011

(87) PCT Pub. No.: WO2010/007949
PCT Pub. Date: Jan. 21, 2010

(65) Prior Publication Data
US 2011/0143259 A1      Jun. 16, 2011

(30) Foreign Application Priority Data

Jul. 15, 2008 (JP) .................. 2008-184213
Dec. 12, 2008 (JP) .................. 2008-317575

(51) Int. Cl.
*H01M 8/12* (2006.01)
*H01B 1/08* (2006.01)
*H01M 8/10* (2006.01)

(52) U.S. Cl.
CPC .... *H01M 8/1246* (2013.01); *H01M 2300/0074* (2013.01); *H01M 2300/0065* (2013.01); *H01M 8/124* (2013.01); *H01B 1/08* (2013.01); *H01M 8/1016* (2013.01); *H01M 2008/1095* (2013.01); *H01M 2300/0071* (2013.01);

(Continued)

(58) Field of Classification Search
CPC .......... H01M 2300/0071; H01M 8/10; H01M 8/1016; H01M 8/12; H01M 8/124; H01M 8/1246; H01M 2300/0065; H01M 2300/0074
USPC ....................................................... 429/495
See application file for complete search history.

(56) References Cited

U.S. PATENT DOCUMENTS

2003/0219637 A1* 11/2003 Coors ............................ 429/17
2004/0161650 A1*  8/2004 Robert ............................ 429/32
2008/0060935 A1*  3/2008 Hartvigsen ................... 204/242

(Continued)

FOREIGN PATENT DOCUMENTS

EP        1953540 A1    8/2008
JP        9-501722 A    2/1997

(Continued)

OTHER PUBLICATIONS

European Search Report issued in European Application No. 09797874.6 dated Jul. 14, 2011.

(Continued)

*Primary Examiner* — Jeremiah Smith
(74) *Attorney, Agent, or Firm* — Sughrue Mion, PLLC

(57) ABSTRACT

Provided is a fuel cell which can obtain a sufficiently high electromotive force even under a low-temperature condition such as room temperature without using a deleterious substance or platinum. This fuel cell uses an electrolyte layer containing a layer-shaped metal oxide which has been subjected to the steam treatment.

13 Claims, 15 Drawing Sheets

(52) U.S. Cl.
CPC ..... *H01M 2300/0094* (2013.01); *Y02E 60/521* (2013.01); *Y02E 60/525* (2013.01)
USPC .......................................................... 429/495

(56) References Cited

U.S. PATENT DOCUMENTS

2009/0214904 A1* 8/2009 Zhou ............................. 429/17
2012/0202128 A1* 8/2012 Nakanishi et al. ............ 429/408

FOREIGN PATENT DOCUMENTS

| JP | 11-144745 | A | 5/1999 |
| JP | 2000-173640 | A | 6/2000 |
| JP | 2004-224862 | A | 8/2004 |
| JP | 2005-67915 | A | 3/2005 |
| JP | 2006-244961 | A | 9/2006 |
| JP | 2008-504660 | A | 2/2008 |
| JP | 2009-140783 | A | 6/2009 |
| WO | 2007/060925 | A1 | 5/2007 |
| WO | 2008/120675 | A1 | 10/2008 |

OTHER PUBLICATIONS

Bonanos, N. et al., "Perovskite solid electrolytes: Structure, transport properties and fuel cell applications", Solid State Ionics, North Holland Pub. Company. Amsterdam, NL, vol. 79, Jul. 1, 1995, pp. 161-170.

Terasaki, I., et al., "Large thermoelectric power in $NaCo_2O_4$ single crystals", Physical Review B, vol. 56, No. 20, Nov. 1, 1997, pp. R12685-R12687.

Lepoittevin, C., et al., "A relative of $Sr_4Fe_6O_{13}$ with double perovskite layers: $Bi_4Sr_{14}Fe_{24}O_{56}$, m =2-members of a potential series $[(Sr,Bi)_2Fe_4O_{7-\delta}][(Sr,Bi)_2Fe_2O_6]m$", Chemistry of Materials, vol. 16, No. 26, Dec. 28, 2004, pp. 5731-5735.

International Preliminary Report on Patentability, and English Language Translation of Written Opinion for PCT/JP2009/062608, Feb. 8, 2011.

Chinese Office Action corresponding to Chinese Patent Application No. 200980127764.4, dated Nov. 5, 2012.

* cited by examiner

FUEL CELL AND ELECTRICITY GENERATION METHOD USING THE SAME

CROSS REFERENCE TO RELATED APPLICATIONS

This application is a National Stage of International Application No. PCT/JP2009/062608 filed Jul. 10, 2009, which claims priority from Japanese Patent Application No. 2008-184213 filed Jul. 15, 2008, and Japanese Patent Application No. 2008-317575 filed Dec. 12, 2008, the contents of all of which are incorporated herein by reference in their entirety.

TECHNICAL FIELD

The present invention relates to a fuel cell using a layered metal oxide as a solid electrolyte material, and to an electricity generation method using the same.

BACKGROUND ART

Practical application of fuel cells as environmentally-friendly electrical power sources is anticipated because they can achieve higher energy efficiencies than conventional power generating technologies. Various efforts have already been made towards practical application, and fuel cells are being developed using polymers and metal oxides as electrolyte materials. In particular, because polymer electrolyte fuel cells operate at low temperatures around 80° C., they should be applicable to automobiles and household power-generating units. A polymer electrolyte fuel cell is generally configured with a catalyst layer functioning as an electrode, a gas dispersion layer, a separator and the like arranged in layers on both sides of a proton-conductive polymer electrolyte film.

A polymer electrolyte fuel cell has the feature of allowing electricity generation even under low-temperature conditions such as those described above. Because scarce and expensive platinum (Pt) is used as the electrode catalyst, however, they have not become truly widespread for reasons of high-cost. The amount of Pt used needs to be reduced in order to reduce the cost of the fuel cell. Patent Literature 1 below describes a fuel cell using no Pt, and describes using an anion-exchange membrane as the electrolyte layer, and using hydrazine ($N_2H_4$) and other compounds containing hydrogen and nitrogen atoms as fuels.

Technologies have already been developed for fuel cells using anion-exchange membranes for the electrolyte layer, and for example Patent Literatures 2 to 5 describe ion-exchange membranes and fuel cells using these.

CITATION LIST

Patent Literature

Patent Literature 1: Japanese Patent Application Laid-open No. 2006-244961

Patent Literature 2: Japanese Patent Application Laid-open No. 2004-224862

Patent Literature 3: Japanese Patent Application Laid-open No. H11-144745

Patent Literature 4: Japanese Unexamined Patent Publication (Translation of PCT Application) No. 2008-504660

Patent Literature 5: Japanese Unexamined Patent Publication (Translation of PCT Application) No. H9-501722.

SUMMARY OF INVENTION

Technical Problem

However, because the hydrazine ($N_2H_4$) used as fuel by the fuel cell described in Patent Literature 1 is a flammable, poisonous chemical with a strong odor, there are problems of safety that need to be resolved before such fuel cells can be used in automobiles and household power-generating units. On the other hand, the fuel cells using ion-exchange membranes that are described in Patent Literatures 2 to 5 do not have sufficient electromotive force at low temperatures unless Pt is used as the electrode catalyst.

It is an object of the present invention to resolve these problems and provide a fuel cell whereby sufficiently strong electromotive force can be obtained even under low-temperature conditions such as room temperature without the use of poisonous chemicals or platinum, along with a power generation method using the same.

Solution to Problem

The fuel cell of the present invention is provided with an electrolyte layer containing a layered metal oxide that has been subjected to steam treatment. It is believed that in the layered metal oxide used as the electrolyte material in the fuel cell of the present invention, conductivity of hydroxide ions results when oxygen vacancies in the layered metal oxide are hydrated by water molecules as a result of steam treatment. Evaluative tests by the inventors in this case have shown that sufficiently strong electromotive force can be obtained even under low-temperature conditions (about 20 to 80° C.) by adopting an electrolyte layer containing this layered metal oxide.

The specific configuration of the fuel cell of the present invention can be as follows. The fuel cell of the present invention is provided with an electrolyte layer containing a layered metal oxide that has been steam treated, a main cell body the interior space of which is divided by the electrolyte layer into a first and second region, an anode provided on the side of the first region of the electrolyte layer and having a catalyst layer containing Pd and the aforementioned layered metal oxide, a cathode provided on the side of the second region of the electrolyte layer, hydrogen supply means for supplying hydrogen to the first region, and oxygen supply means for supplying oxygen together with moisture to the second region.

With a fuel cell of this configuration, sufficiently strong electromotive force can be obtained even under low-temperature conditions (about 20 to 80° C.) because the electrolyte layer contains a layered metal oxide having the aforementioned properties. Because the electrolyte layer and catalyst layer both contain the same kind of layered metal oxide, moreover, the boundary between the two can be made continuous. This makes it possible to minimize the internal resistance of a laminate of the electrolyte layer and catalyst layer.

The electricity generation method of the present invention uses a fuel cell that is provided with an electrolyte layer containing a layered metal oxide, a main cell body the internal area of which is divided into a first and second region by the electrolyte layer, an anode provided on the side of the first region of the electrolyte layer and having a catalyst layer containing Pd and a layered metal oxide, and a cathode provided on the side of the second region of the electrolyte layer, and comprises a step of steam treating the layered metal oxide contained in the electrolyte layer, and a step of supplying hydrogen to the first region and supplying oxygen together with moisture to the second region.

As discussed above, it is believed that in the layered metal oxide used in the electricity generation method of the present invention, conductivity of hydroxide ions results when oxygen vacancies in the layered metal oxide are hydrated by water molecules as a result of steam treatment. Sufficient strong electromotive force can be obtained even at room temperature by using an electrolyte layer containing this layered metal oxide.

In the fuel cell and electricity generation method of the present invention, the electrolyte layer preferably contains one layered metal oxide selected from the group consisting of $NaCO_2O_4$, $LaFe_3Sr_3O_{10}$ and $Bi_4Sr_{14}Fe_{24}O_{56}$. These layered metal oxides provide superior conductivity of hydroxide ions when subjected to steam treatment.

Advantageous Effects of Invention

With the present invention, sufficiently strong electromotive force can be obtained even under low-temperature conditions such as room temperature without the use of poisonous chemicals or platinum.

DESCRIPTION OF EMBODIMENTS (Layered Metal Oxide)

There are no particular limitations on what layered metal oxide can be used as the electrolyte material as long as conductivity of hydroxide ions is achieved as a result of steam treatment, but from the standpoint of achieving strong electromotive force, $NaCO_2O_4$, $LaFe_3Sr_3O_{10}$ and $Bi_4Sr_{14}Fe_{24}O_{56}$ are preferred. These materials can be prepared by solid-phase reaction for example. "Layered" here means a crystal structure in which atoms or atomic groups are arranged on a particular plane to form a sheet structure, and repetitions of this sheet structure are seen perpendicular to this plane.

$NaCO_2O_4$ (sodium cobaltate) is an oxide that has gained attention in recent years as a thermoelectric conversion material. $NaCO_2O_4$ can be obtained as follows. First, a solution of sodium acetate and cobalt acetate tetrahydrate dissolved in specific proportions is dried, and the resulting sample is pulverized and pre-baked. The pre-baked sample is pulverized, and then molded into a pellet that is then baked again at about 750 to 850° C. The baked pellet is then pulverized and pelletized, and sintered at a temperature of about 900 to 1000° C. to obtain $NaCO_2O_4$ having a layered crystal structure.

$LaFe_3Sr_3O_{10}$ is a perovskite-type layered oxide. $LaFe_3Sr_3O_{10}$ is obtained for example by placing specific amounts of lanthanum oxide, strontium carbonate and iron oxide in a ball mill, and processing them until all components are uniformly mixed. The resulting sample is molded into a pellet, and baked at about 1400 to 1500° C. to obtain $LaFe_3Sr_3O_{10}$ having a layered crystal structure.

$Bi_4Sr_{14}Fe_{24}O_{56}$ is obtained for example by placing specific amounts of bismuth oxide, strontium oxide and iron oxide in a ball mill, and processing them until all components are uniformly mixed. The resulting sample is molded into a pellet, and baked at about 1100 to 1200° C. to obtain $Bi_4Sr_{14}Fe_{24}O_{56}$ having a layered crystal structure.

$NaCO_2O_4$, $LaFe_3Sr_3O_{10}$ or $Bi_4Sr_{14}Fe_{24}O_{56}$ powder having a layered crystal structure is molded into the desired shape, and used for the electrolyte layer of the fuel cell. Oxides and impurities other than $NaCO_2O_4$, $LaFe_3Sr_3O_{10}$ or $Bi_4Sr_{14}Fe_{24}O_{56}$ can be contained in the electrolyte layer to the extent that they do not inhibit the function of the layered metal oxide.

(Fuel Cell)

Figure 1:
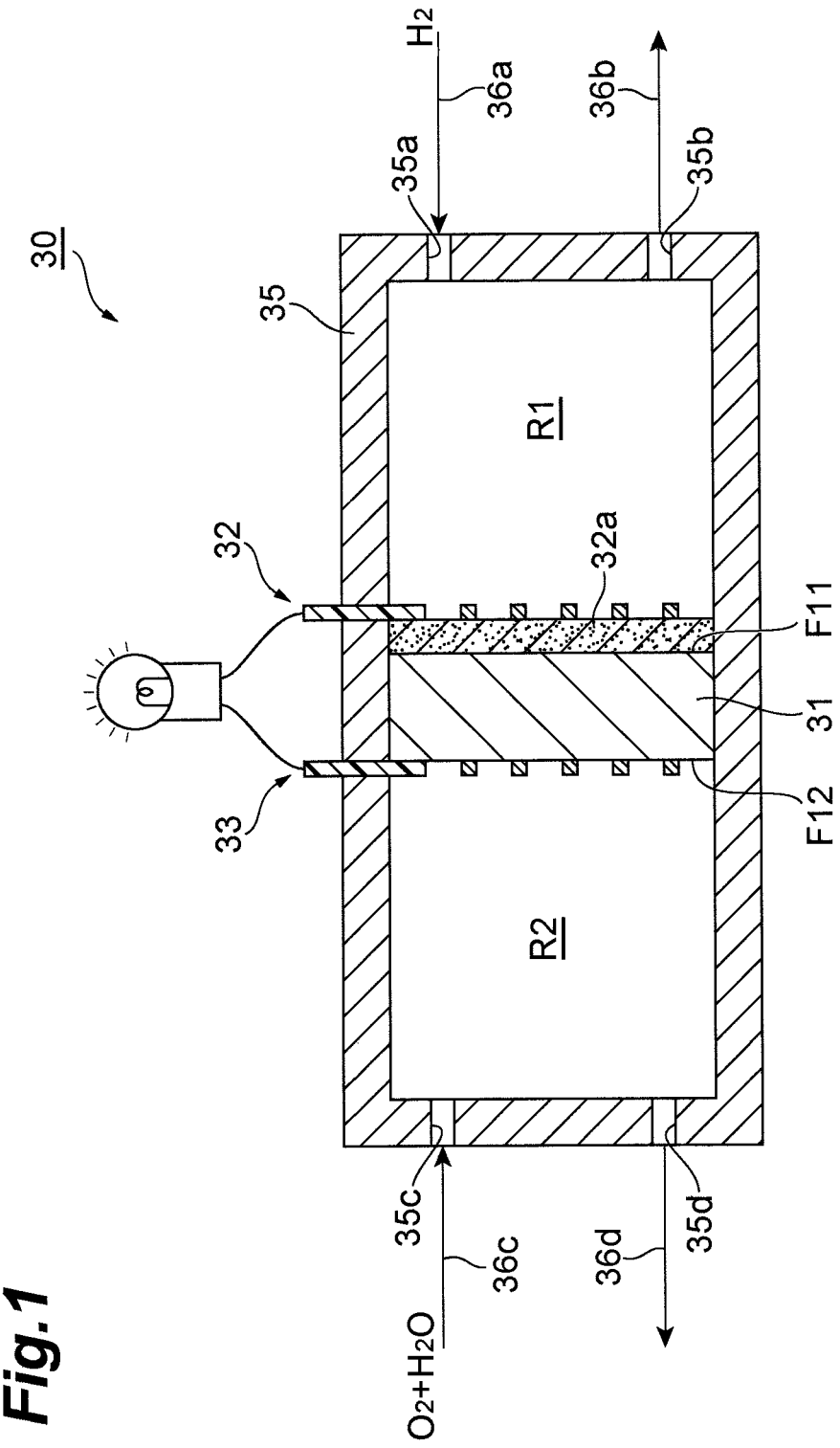
FIG. 1 is a model cross-section showing a preferred embodiment of the fuel cell of the present invention.

A fuel cell equipped with an electrolyte layer containing a layered metal oxide is explained here. A fuel cell having a $Pd/NaCO_2O_4$ catalyst and a solid electrolyte layer consisting of a sintered body of $NaCO_2O_4$ is given here as an example. FIG. 1 is a model cross-section showing the configuration of the fuel cell of this embodiment. Fuel cell 30 shown in this figure comprises solid electrolyte layer 31 consisting of a sintered body of $NaCO_2O_4$, anode 32 and cathode 33 arranged on either side of solid electrolyte layer 31, and main cell body 35, the interior space of which is divided into first region R1 and second region R2 by solid electrolyte layer 31.

The $NaCO_2O_4$ sintered body making up solid electrolyte layer 31 can be prepared by compression molding and baking $NaCO_2O_4$ powder. For purposes of obtaining high ion conductivity, there are preferably as few gaps as possible in solid electrolyte layer 31. The thickness of solid electrolyte layer 31 can be set appropriately according to the purpose and operating conditions of the fuel cell and the like, but is preferably 0.02 to 15 mm, or more preferably 0.3 to 6 mm. If the thickness of solid electrolyte layer 31 is less than 0.3 mm, solid electrolyte layer 31 will tend to be too weak, and it will be necessary to use an anode-supporting disk. If the thickness of solid electrolyte layer 31 exceeds 15 mm, on the other hand, the internal resistance will tend to increase.

Anode 32 is provided on the first region R1 side of solid electrolyte layer 31, and has catalyst layer 32*a* containing Pd and $NaCO_2O_4$. From the standpoint of thoroughly and stably promoting a hydrogen oxidation reaction in catalyst layer 32*a*, the amount of Pd supported by the $Pd/NaCO_2O_4$ catalyst is preferably 10 to 20 mass %, or more preferably 12 to 18 mass %, or still more preferably 13 to 16 mass % based on the mass of the $NaCO_2O_4$ (carrier).

A laminate of solid electrolyte layer 31 and catalyst layer 32*a* can be obtained by coating a paste containing the $Pd/NaCO_2O_4$ catalyst on surface F11, which becomes the first region R1 side of solid electrolyte layer 31, and then drying the paste and baking it in an electric furnace. In the fuel cell 30 of this embodiment, the boundary between solid electrolyte layer 31 and catalyst layer 32a can be continuous because both contain $NaCO_2O_4$.

Cathode 33 is provided on the second region R2 side of solid electrolyte layer 31. In this embodiment, cathode 33 does not have a catalyst layer, but a catalyst layer can also be formed on surface F12, which becomes the second region R2 side of solid electrolyte layer 31, and for example a catalyst layer consisting of a $Pd/NaCO_2O_4$ can be formed as in the case of anode 32.

Main cell body 35 contains anode 32, cathode 33 and solid electrolyte layer 31, and its interior space is divided by solid electrolyte layer 31 into first region R1 and second region R2. Main cell body 35 has gas supply port 35a for supplying hydrogen inside first region R1, and gas vent 35b for venting gas from first region R1. Pipe 36a and pipe 36b are connected, respectively, to gas supply port 35a and gas vent 35b. A valve (not shown) or the like for adjusting the amount of the gas supply is provided midway along pipe 36a. In this embodiment, the hydrogen supply means consists of gas supply port 35a, pipe 36a and a valve or the like for adjusting the gas supply.

Main cell body 35 also has gas supply port 35c for supplying moisture together with oxygen inside second region R2, and gas vent 35d for venting gas from second region R2. Pipe 36c and pipe 36d are connected, respectively, to gas supply port 35c and gas vent 35d. A valve (not shown) or the like for adjusting the gas supply is provided along pipe 36c. In this embodiment, the oxygen supply means consists of gas supply port 35a, pipe 36c and a gas supply adjustment valve or the like.

The conductive wires connected to anode 32 and cathode 33 can be copper wires, nichrome wires, platinum wires or the like. The wires are not limited to these, and can be selected appropriately according to the operating conditions and the like.

(Electricity Generation Method)

Next, an electricity generation method using fuel cell 30 is explained. In order to achieve hydroxide ion conductivity in solid electrolyte layer 31, steam treatment of the $NaCO_2O_4$ making up solid electrolyte layer 31 must be performed before electricity generation by fuel cell 30 is initiated. Steam treatment of the layered metal oxide making up solid electrolyte layer 31 serves to hydrate oxygen vacancies in the layered metal oxide with water molecules. This provides hydroxide ion conductivity. Because hydroxide ions ($OH^-$) are the ion conductor of fuel cell 30, it is classified as an anion exchange-type fuel cell.

Solid electrolyte layer 31 can be steam treated for example by adjusting the inside of main cell body 35 (first region R1 and second region R2) to a specific temperature, relative humidity and pressure. The steam treatment conditions are not particularly limited as long as hydrogen ion conductivity is achieved, but the following conditions are desirable from the standpoint of operating efficiency of steam treatment, conductivity after steam treatment and the like. That is, the temperature for steam treatment is preferably 20 to 150° C., or more preferably 40 to 130° C., or still more preferably 50 to 120° C. The relative humidity for steam treatment is preferably 30 to 100%, or more preferably 40 to 90%, or still more preferably 50 to 90%. The pressure for steam treatment is preferably 0.1 to 1 MPa, or more preferably 0.1 to 0.8 MPa, or still more preferably 0.2 to 0.5 MPa. The steam treatment time is preferably 2 to 48 hours, or more preferably 3 to 24 hours.

From the standpoint of achieving strong catalytic activity, catalyst layer 32a is preferably hydrogen treated before or after steam treatment. Hydrogen treatment of catalyst layer 32a can be accomplished for example by supplying hydrogen with the interior of first region R1 of main cell body 35 adjusted to a specific temperature and pressure. The conditions for hydrogen treatment are not particularly limited as long as sufficiently strong catalytic activity is achieved, but the following conditions are desirable from the standpoint of operating efficiency of hydrogen treatment, catalytic activity after hydrogen treatment and the like. That is, the temperature for hydrogen treatment is preferably 80 to 200° C. or more preferably 100 to 180° C. The pressure for hydrogen treatment is preferably 0.1 to 1 MPa, or more preferably 0.1 to 0.8 MPa. The hydrogen concentration for hydrogen treatment is preferably 10 to 100 vol %, or more preferably 20 to 80 vol %. The hydrogen treatment time is preferably a matter of hours, or more preferably 3 to 24 hours.

Following steam treatment, $H_2$-containing gas is supplied to first region R1 to achieve the reaction represented by Formula (1) below at the anode. Gas containing $O_2$ and $H_2O$ is supplied to second region R2 to achieve the reaction represented by Formula (2) below at the cathode. The gas supplied to first region R1 can be hydrogen alone, or may be a mixed gas comprising hydrogen and an inactive gas. The gas supplied to second region R2 may be any containing oxygen and moisture, and humidified oxygen or humidified air can be used.

$$2H_2 + 4OH^- \rightarrow 4H_2O + 4e^- \quad (1)$$

$$O_2 + 2H_2O + 4e^- \rightarrow 4OH^- \quad (2)$$

A fuel cell 30 of this configuration has a broad range of operating temperatures, from 10 to 800° C. Consequently, adequate power can be generated at relatively low temperatures, such as 20 to 80° C., with this fuel cell 30.

One embodiment of the present invention was explained in detail, but the present invention is not limited to this embodiment. For example, in the embodiment above $NaCO_2O_4$ was used as the layered metal oxide, but a fuel cell may also be prepared using $LaFe_3Sr_3O_{10}$ or $Bi_4Sr_{14}Fe_{24}O_{56}$ instead of $NaCO_2O_4$.

A single-cell fuel cell 30 was given as an example in this embodiment, but the cell could also be configured as a fuel cell stack comprising multiple cells layered to achieve greater output. In this case, separators or the like can be provided as necessary to prevent mixing of the supplied hydrogen and oxygen.

EXAMPLES

The present invention is explained below using examples, but the present invention is not limited to these examples.

Example 1

The following reagents were used in Example 1, but others could be used appropriately.

Sodium acetate ($CH_3COONa$, Kanto Chemical, special grade)

Cobalt acetate tetrahydrate (($CH_3COO)_2Co \cdot 4H_2O$, Wako Pure Chemical, Cica special grade (special high grade))

Dinitrodiammine palladium ($Pd(NO_2)_2(NH_3)_2$, Tanaka Precious Metals)

Ethylene Glycol ($HOCH_2CH_2OH$, Wako Pure Chemical, special grade)

Preparation of $NaCO_2O_4$ Pellet

A $NaCO_2O_4$ pellet was prepared according to the following steps (1) to (5). In this example, preparation of the $NaCO_2O_4$ pellet involves a baking step at a temperature of about 900° C., and Na evaporates at such high temperatures.

Thus, since an impurity ($CO_3O_4$) will occur in the product if the raw materials are prepared with the theoretical molar ratio (Na:Co=1:2), the molar ratio of Na to Co in the raw materials was raised to Na:Co=1.6:2, and the final $NaCO_2O_4$ pellet was subjected to structural analysis.

(1) 5.00 g (60.95 mmol) of sodium acetate and 19.00 g (76.28 mmol) of cobalt acetate tetrahydrate were measured into a Teflon® beaker with an internal volume of 200 mL, and dissolved with 40 mL of distilled water.

(2) The solution obtained in (1) above was agitated at 80° C. to evaporate the water, placed in a drier (temperature: 80° C.), and dried overnight.

(3) The dried sample was pulverized thoroughly in an agate mortar, and then transferred to an alumina crucible. This crucible was placed in a Muffle furnace, and the sample was pre-baked for a holding time of 5 hours at 750° C. in air.

(4) The pre-baked sample was pulverized in an agate mortar, and molded (pressure 30 MPa, holding time 5 minutes) into a pellet (20 mm dia., up to 3 mm thick) with a pelletizer. The resulting molded pellet was placed in a Muffle furnace, and main-baked for a holding time of 3 hours at 790° C. in air.

(5) The main-baked sample was contained in a planetary ball mill (Fritsch pulverisette), and pulverized for 20 minutes at a rotational speed of 300 rpm. The resulting powder was placed in a pelletizer and molded into a pellet (10 mm dia., 1.7 to 12 mm thick). When the pellet thickness was less than 6 mm, the pressure during molding was 30 MPa and the holding time was 5 minutes, while when the pellet thickness was about 12 mm, the pressure was 40 MPa and the holding time was 5 minutes. The resulting molded pellet was placed in a Muffle furnace, and sintered in air under conditions of temperature 900° C., holding time 32 hours to obtain a sintered body of $NaCO_2O_4$.

Structural Analysis of $NaCO_2O_4$

The structure of the $NaCO_2O_4$ was analyzed using a powder X-ray diffractometer (Rigaku, RINT-Ultima+). The measurement conditions were as follows. No impurity ($CO_3O_4$) was detected in the prepared sample ($NaCO_2O_4$ sintered body) as a result of structural analysis.

Radiation source: CuKα
Wavelength λ: 0.154056 nm
Tube voltage: 40 kV
Current: 20 mA
Measurement range 2θ: 2 to 80°
Scanning axis: 2θ/θ
Scan step: 0.02°
Scan speed: 2°/minute
Divergence slit: 1/2°
Scattering slit: 1/2°
Light-receiving slit: 0.15 mm Preparation of Pd/$NaCO_2O_4$ Catalyst (Supported Pd 15 Mass %)

1.0 g of $NaCO_2O_4$ powder (S=1 $m^2$/g) was measured into an evaporation dish, and 3.87 g of a $Pd(NH_3)_2(NO_2)_2$ nitrate solution (4.557 mass %) was added. This was impregnated on a water bath at 80° C., and the water was evaporated until a powder was obtained. The resulting sample was placed in a Muffle furnace, and baked in air under conditions of temperature 600° C., holding time 2 hours to obtain a Pd/$NaCO_2O_4$ catalyst comprising 15 mass % supported Pd based on the mass of the $NaCO_2O_4$ (carrier).

Formation of Catalyst Layer 10 mg of the Pd/$NaCO_2O_4$ catalyst and 4 μL of ethylene glycol were thoroughly mixed on one surface of the $NaCO_2O_4$ pellet to prepare a paste containing these. This paste was coated on one side of the $NaCO_2O_4$ pellet. The $NaCO_2O_4$ pellet with the paste coated on one side was placed in an electrical furnace, and baked in air under conditions of temperature 400° C., holding time 2 hours.

Observation by Scanning Electron Microscope

Figure 2:
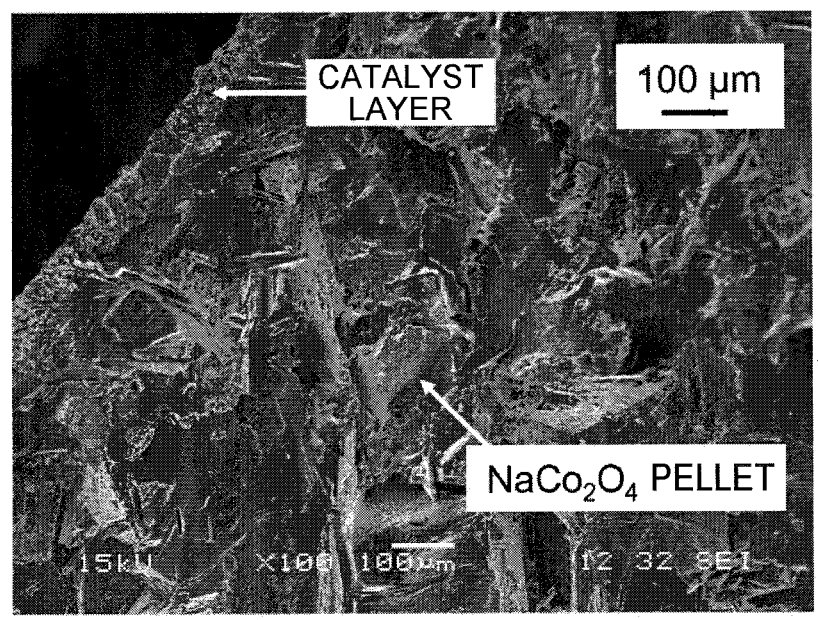
FIG. 2 is an SEM image showing a $NaCO_2O_4$ pellet and a catalyst layer in cross-section.

Using a scanning electron microscope (SEM, Nihon Denshi, JSM-6300), the $NaCO_2O_4$ pellet and catalyst layer were observed in cross-section. FIG. 2 is an SEM image showing a cross-section of a $NaCO_2O_4$ pellet having a catalyst layer (thickness about 80 μm) consisting of Pd/$NaCO_2O_4$ catalyst (supported Pd 15 mass %) formed on the surface thereof.

Example 2

Preparation of $LaFe_3Sr_3O_{10}$ Pellet

An $LaFe_3Sr_3O_{10}$ pellet was prepared by the following steps (1) to (5).

(1) 3.68 g of $La_2O_3$, 10.00 g of $SrCO_3$ and 5.41 g of $Fe_2O_3$ were mixed for 30 minutes at 300 rpm in a planetary ball mill.

(2) The resulting powdery solid was molded with a pelletizer (Nihon Bunko) into a pellet 20 mm in diameter and 2 mm thick (pressure 20 MPa, holding time 5 minutes).

(3) The molded pellet was baked in air for 3 hours at 1400° C. (program rate to 1000° C.: 10 K/min.; 1000 to 1400° C.: 50 K/min.).

(4) The pellet was air cooled and pulverized in an alumina mortar.

(5) The resulting powdery solid was molded with a pelletizer (Nihon Bunko) into a pellet 20 mm in diameter and 1.25 mm thick (pressure 80 MPa, holding time 10 minutes).

Structural Analysis of $LaFe_3Sr_3O_{10}$ Pellet

Figure 3:
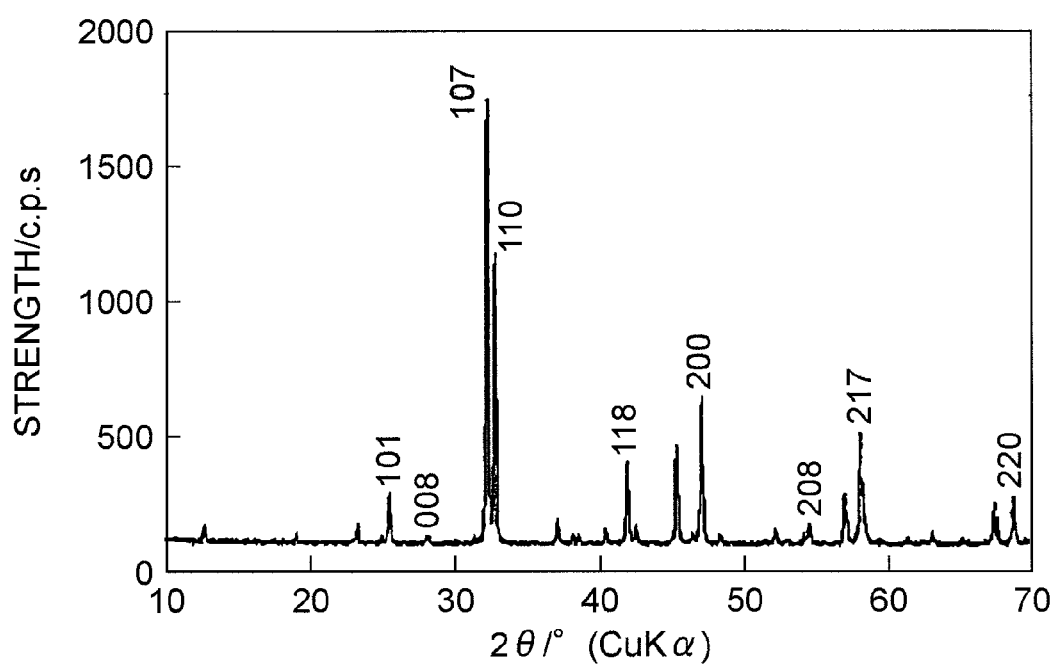
FIG. 3 shows the results of structural analysis by X-ray diffraction (XRD) of $LaFe_3Sr_3O_{10}$.

The structure of the $LaFe_3Sr_3O_{10}$ was analyzed by X-ray diffraction (XRD) in the same way as the $NaCO_2O_4$. The results are shown in FIG. 3.

Preparation of 15 wt % Pd/$LaFe_3Sr_3O_{10}$ (1) 0.5 g of carrier ($LaFe_3Sr_3O_{10}$ 1400° C. sintered body) was measured into an evaporation dish, and 1.94 g of $Pd(NH_3)_2(NO_2)_2$ nitrate (4.557 wt %) was added.

(2) This was impregnated on a water bath at 80° C., and the water was evaporated until a powder was obtained.

(3) This was baked for 2 hours in air at 600° C. in an electric furnace.

Preparation of 15 wt % Pd/$LaFe_3Sr_3O_{10}$/$LaFe_3Sr_3O_{10}$ Pellet (1) 0.010 g of 15 wt % Pd/$LaFe_3Sr_3O_{10}$ was measured and pulverized in an alumina mortar.

(2) 15 μL of ethylene glycol was added to the pulverized powder, and mixed to form a paste.

(3) The paste was coated on a $LaFe_3Sr_3O_{10}$ pellet (0.2826 g/$cm^2$), and baked in air for 2 hours at 400° C.

Example 3

Preparation of $Bi_4Sr_{14}Fe_{24}O_{56}$ Pellet

A $Bi_4Sr_{14}Fe_{24}O_{56}$ pellet was prepared according to the following steps (1) to (5).

(1) 3.728 g of $Bi_2O_3$, 5.802 g of SrO and 7.665 g of $Fe_2O_3$ were mixed for 30 minutes at 300 rpm in a planetary ball mill.

(2) The resulting powdery solid was molded with a pelletizer (Nihon Bunko) into a pellet 20 mm in diameter and 2 mm thick (pressure 20 MPa, holding time 5 minutes).

(3) The molded pellet was baked in air for 48 hours at 1100° C. (program rate 2 K/minute).

(4) The pellet was air cooled and pulverized in an alumina mortar.

(5) The resulting powdery solid was molded in a pelletizer (Nihon Bunko) into a pellet 20 mm in diameter and 1.25 thick (pressure 80 MPa, holding time 10 minutes).

Preparation of 15 wt % Pd/$Bi_4Sr_{14}Fe_{24}O_{56}$ (1) 0.5 g of the carrier ($Bi_4Sr_{14}Fe_{24}O_{56}$ 1100° C. sintered body) was measured into an evaporation dish, and 1.94 g of $Pd(NH_3)_2(NO_2)_2$ nitrate solution (4.557 wt %) was added.

(2) This was impregnated on a water bath at 80° C., and the water was evaporated to obtain a powder.

(3) This was baked for 2 hours in air at 600° C. in an electric furnace.

Preparation of 15 wt % Pd/$Bi_4Sr_{14}Fe_{24}O_{56}$/$Bi_4Sr_{14}Fe_{24}O_{56}$ Pellet (1) 0.010 g of 15 wt % Pd/$Bi_4Sr_{14}Fe_{24}O_{56}$ was measured and pulverized in an alumina mortar.

(2) 15 μL of ethylene glycol was added to the pulverized powder, and mixed to form a paste.

(3) The paste was coated on an 0.2826 $cm^2$ area of the $Bi_4Sr_{14}Fe_{24}O_{56}$ pellet, and baked in air for 2 hours at 400° C.

Example 4

$NaCO_2O_4$ Pellet Electricity Generation Test

To evaluate the properties of the fuel cell, a disk-shaped $NaCO_2O_4$ sintered body (dia. 20 mm, thickness 1 mm) was prepared. A catalyst layer (dia. 6 mm) was provided in the center of one surface of the $NaCO_2O_4$ sintered body. 15 mass % Pd supported on $NaCO_2O_4$ powder was used as the catalyst.

Figure 4:
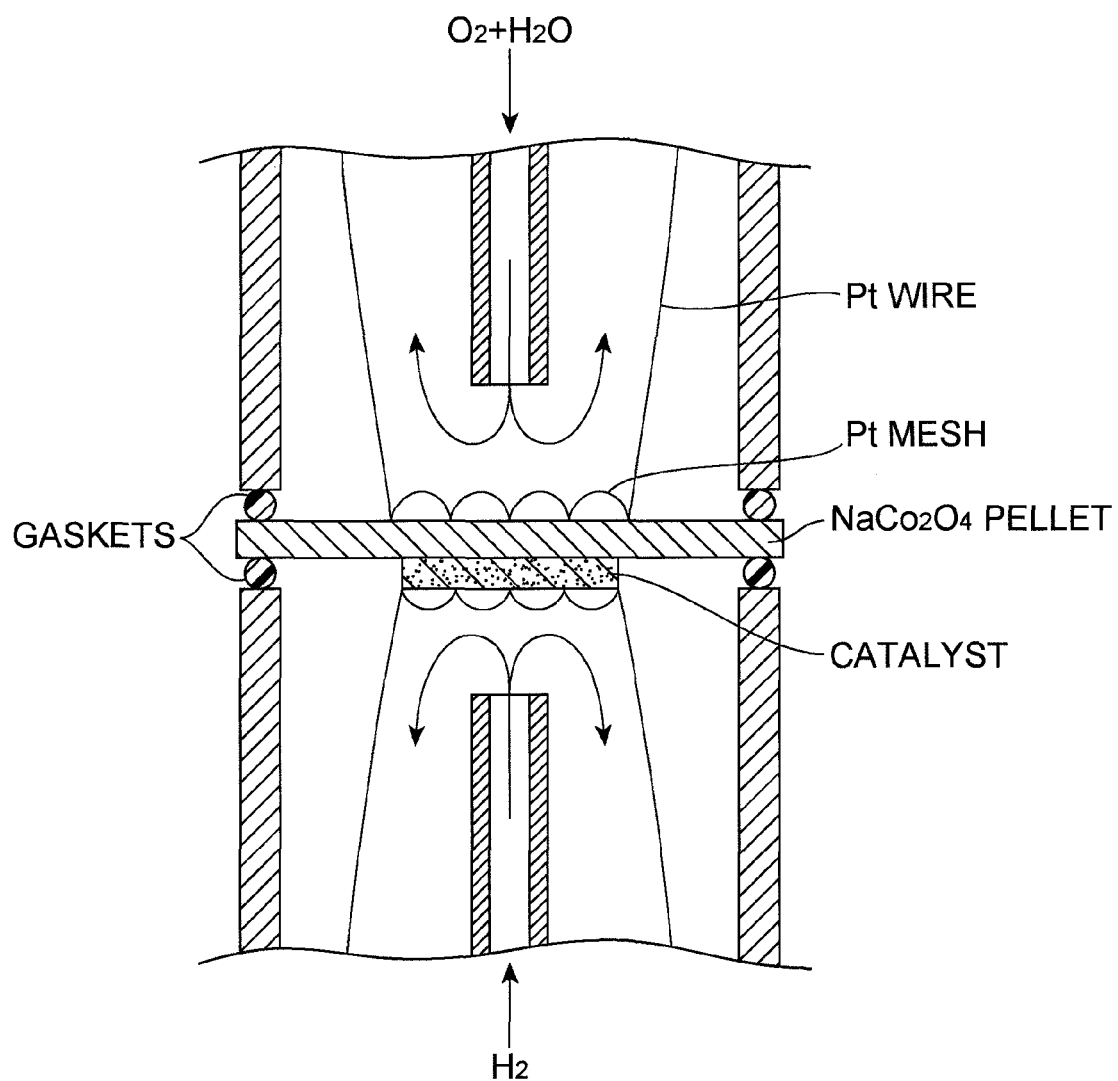
FIG. 4 is a model cross-section showing an evaluation device.

A sample prepared as described above was mounted in the evaluation device shown in FIG. 4, and evaluated. This device supplies humidified hydrogen from below to the surface having the catalyst layer (anode). It also supplies humidified oxygen from above to the surface without the catalyst layer (cathode). Pt mesh was arranged on the upper and lower surfaces of the $NaCO_2O_4$ sintered body, and output was measured from wires (Pt wire) connected to this mesh. Measurement was accomplished by the following procedures.

(1) The sample was mounted in the evaluation device, and the pellet was hydrogen treated. Hydrogen treatment can be performed under conditions of hydrogen concentration 10 to 100 vol %, temperature 80 to 250° C., pressure 0.1 to 1 MPa and treatment time 2 to 48 hours, and conditions of hydrogen concentration 100 vol %, temperature 250° C., pressure 0.1 MPa and treatment time 3 hours of temperature elevation followed by 30 minutes at 250° C. are especially desirable. Hydrogen was supplied at a rate of 18 mL/minute to the anode (catalyst surface), and oxygen at a rate of 10 mL/minute to the cathode (non-catalyst surface). The part with the mounted sample was heated from 80 to 250° C. at a programming rate of about 1.4 K/minute, and then left overnight to cool naturally.

(2) The pellet was steam treated after the hydrogen treatment. Conditions of temperature 20 to 150° C., relative humidity 30 to 100%, pressure 0.1 to 1 MPa and treatment time 2 to 48 hours are suitable for steam treatment, and conditions of temperature 60° C., relative humidity 100%, pressure 0.1 MPa and treatment time 3 hours are especially desirable. Hydrogen was supplied at a rate of 46 mL/minute to the anode (catalyst surface), while oxygen was supplied at a rate of 25 mL/minute to the cathode (non-catalyst surface). Hydrogen and oxygen that had been humidified under temperature conditions of 80° C. were supplied to the anode and cathode, respectively. The part with the mounted sample was adjusted to a temperature of 60° C., and measured for 2 hours.

In this example, the open circuit voltage (OCV) value was 600 mV.

Example 5

Following the testing of Example 4 above, the sample was evaluated again without being removed from the evaluation device. In this example, hydrogen was supplied at 5 mL/minute to the anode (catalyst surface), and oxygen was supplied at 10 mL/minute to the cathode (non-catalyst surface). Oxygen that had been humidified under temperature conditions of 80° C. was supplied to the cathode, while the hydrogen supplied to the anode was not humidified.

Figure 5:
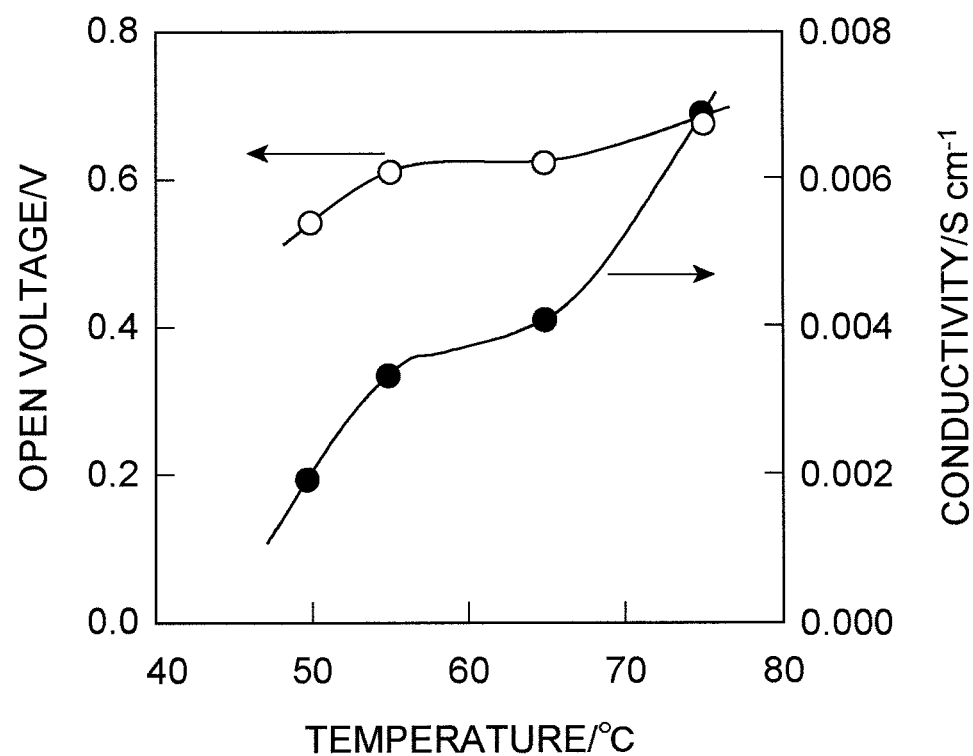
FIG. 5 is a graph showing the results for Example 5.
Figure 6:
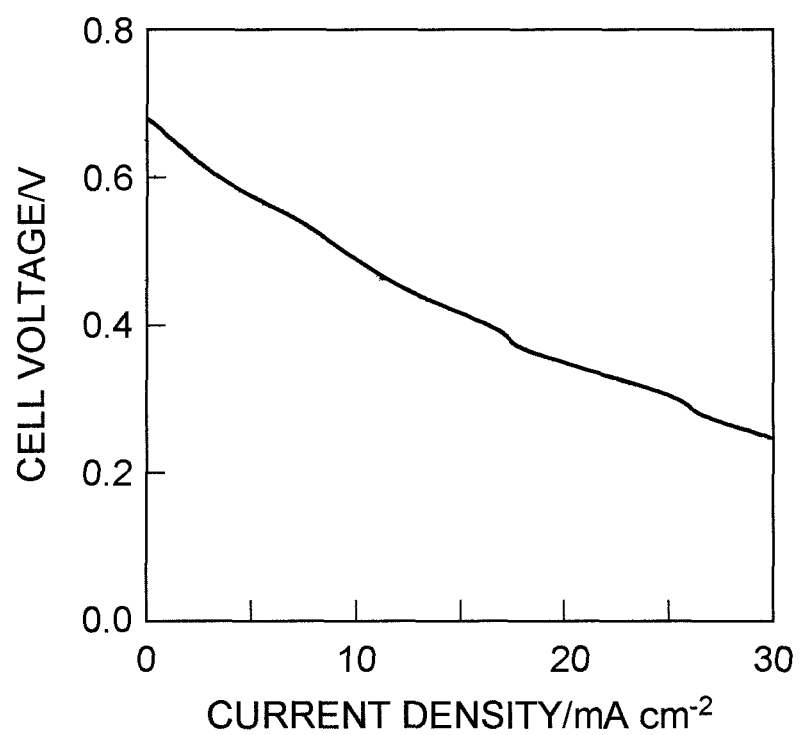
FIG. 6 is a graph showing the results for Example 5.
Figure 7:
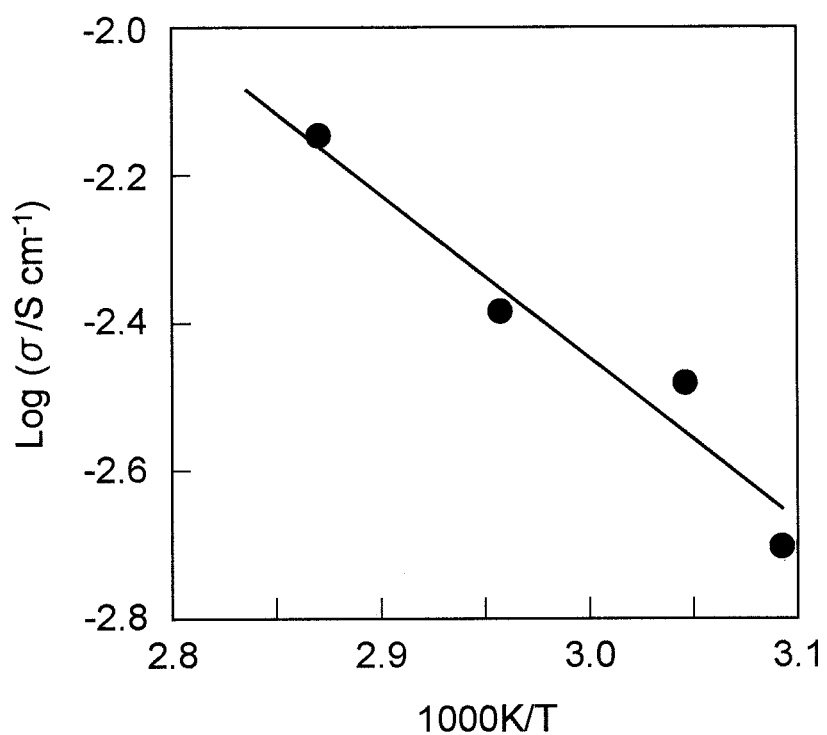
FIG. 7 is a graph showing the results for Example 5.

The temperature of the part with the mounted sample was lowered gradually from 75° C., and an electricity generation test was performed. FIG. 5 is a graph showing the open circuit voltage (OCV) of the sample evaluated in this example, and the temperature dependency of hydroxide ion conductivity. FIG. 6 is a graph showing the current-voltage curve under temperature conditions of 75° C. FIG. 7 is a graph plotting the values for ion conduction activation energy.

Example 6

Figure 8:
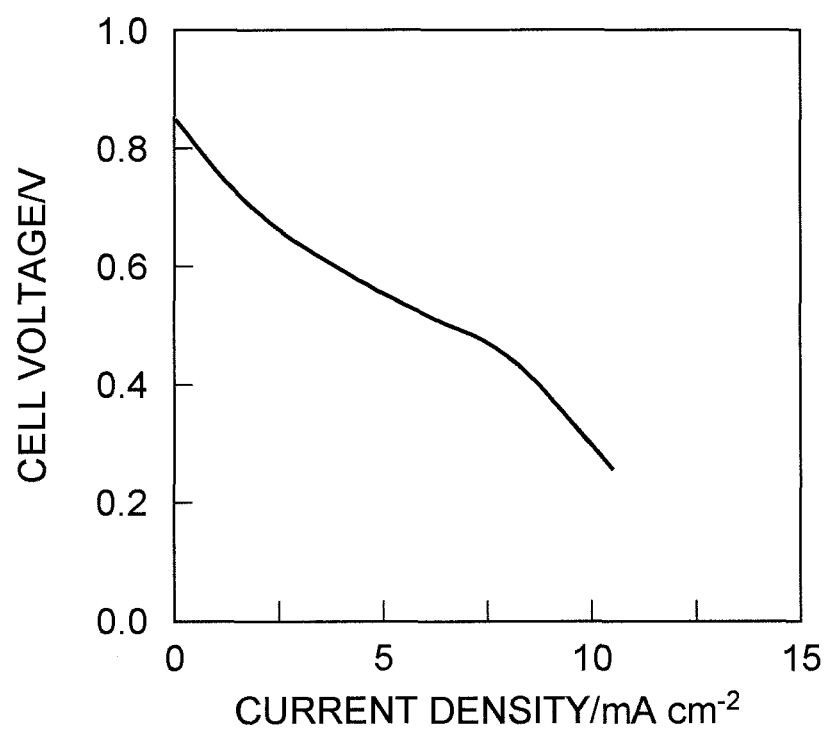
FIG. 8 is a graph showing the results for Example 6.

An evaluation test was performed as in Example 5, except that rather a Pd/$NaCO_2O_4$ catalyst layer (supported Pd 15 mass %) being formed on only one side (anode) of a disk-shaped $NaCO_2O_4$ sintered body, Pd/$NaCO_2O_4$ catalyst layers (supported Pd 15 mass %) were formed on both sides of a $NaCO_2O_4$ sintered body. FIG. 8 is a graph showing the current-voltage curve under temperature conditions of 75° C. In this example the open circuit voltage (OCV) was 0.86 V, but the current value was low. This is thought to be because the set conditions were not adjusted sufficiently.

Example 7

Figure 9:
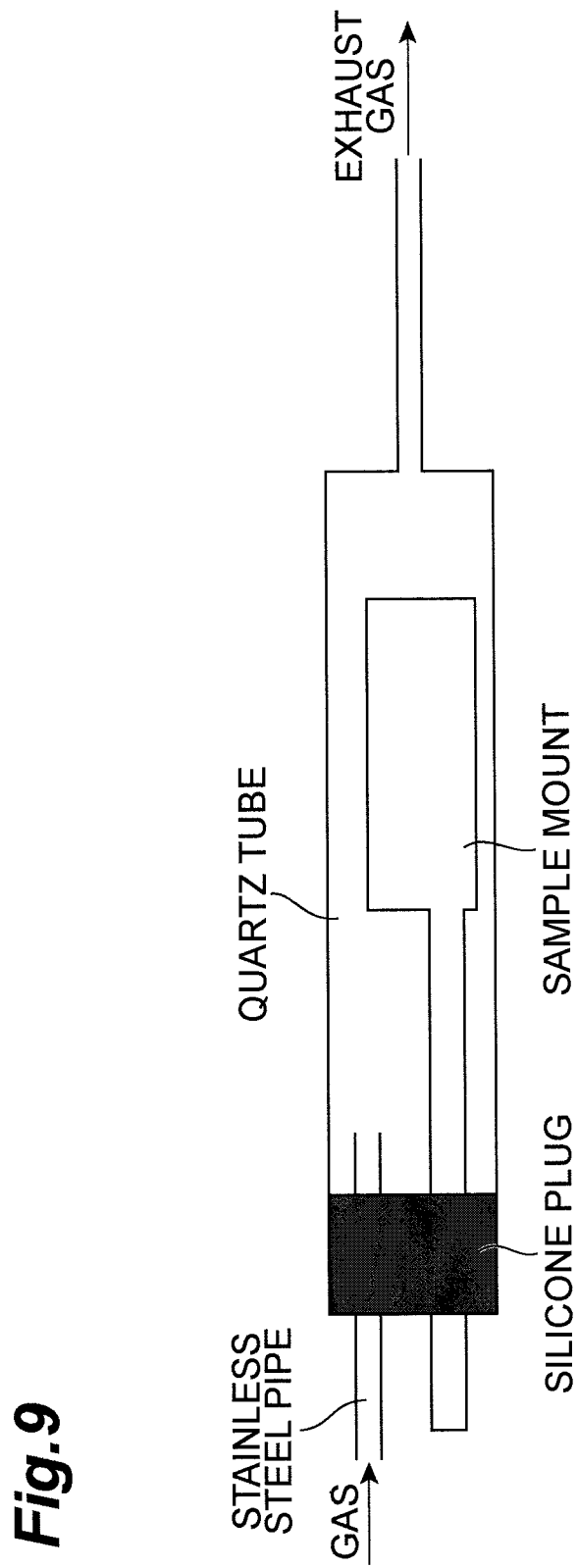
FIG. 9 is a view of the configuration of a reactor.

Electricity Generation Test of $LaFe_3Sr_3O_{10}$ Pellet Using Single-Chamber Fuel Cell FIG. 9 illustrates the configuration of a reactor comprising a quartz tube with a bore of 30 mm. This reactor is provided with a stainless steel pipe for supplying gas, and a Teflon sample mount for mounting the $LaFe_3Sr_3O_{10}$ pellet (hereunder sometimes called the pellet). The opening of the reactor is closed with a silicone plug. Two thermocouples and two conductive wires attached to the respective electrodes of the power generating element can be passed through the silicone plug to measure temperature and current-voltage.

Figure 10:
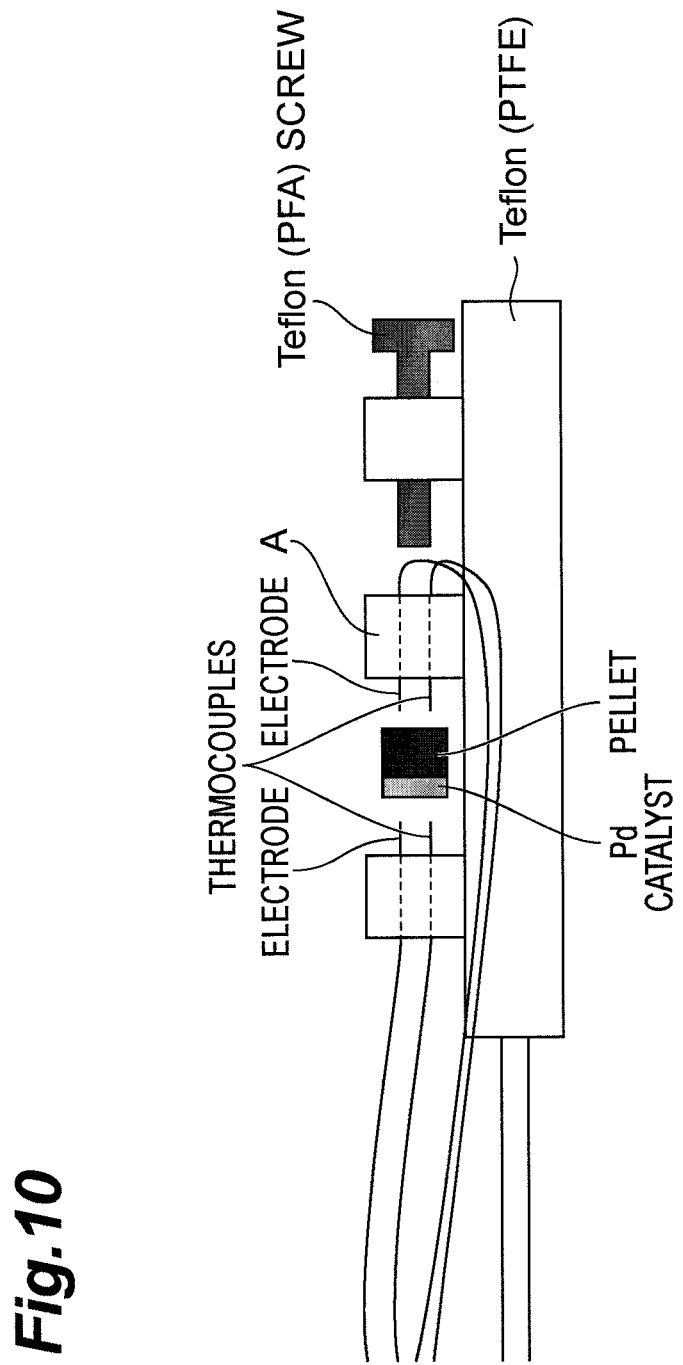
FIG. 10 is a view of the configuration of a sample mount.
Figure 11:
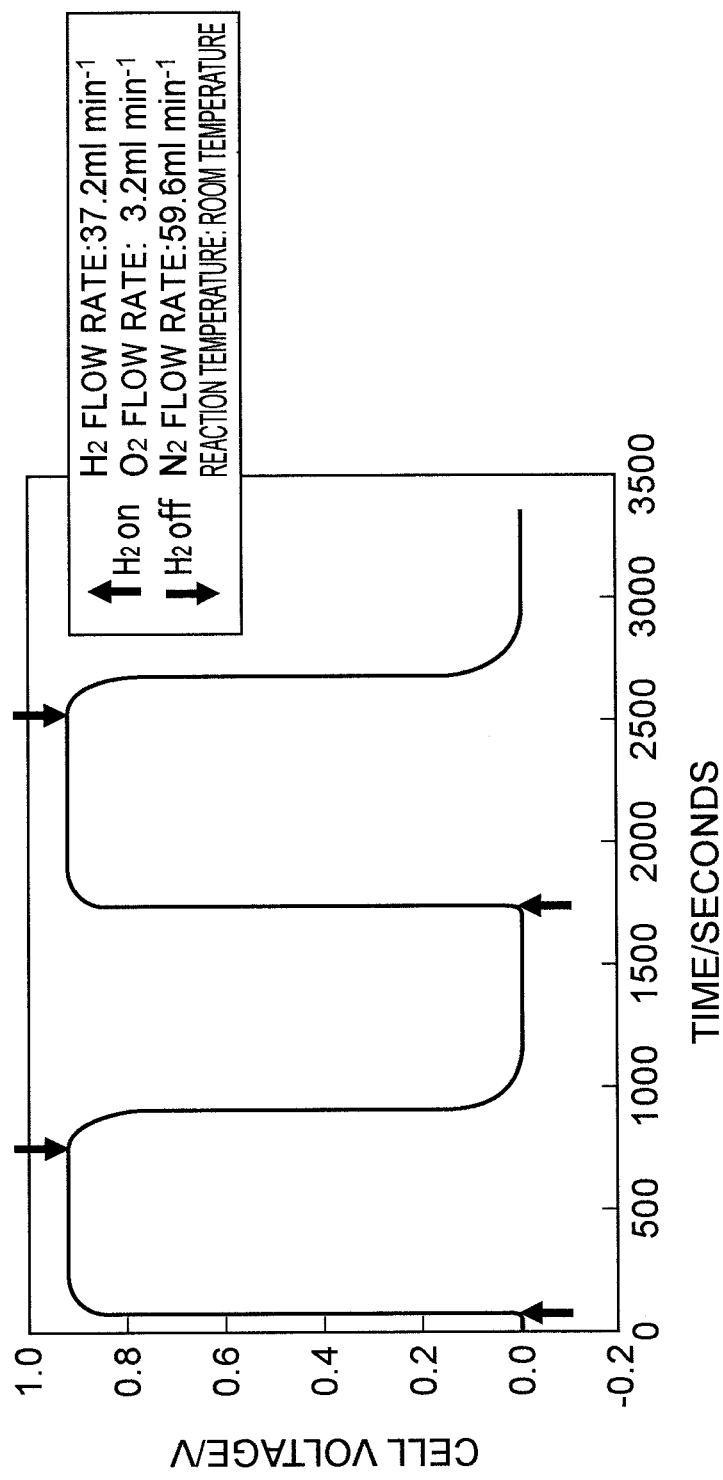
FIG. 11 is a graph showing the results for Example 7.

FIG. 10 illustrates the configuration of the sample mount. From the standpoint of thermal and chemical stability, Teflon® (PTFE) with a heatproof temperature of 260° C. was used as the constituent material. A PTFE rod (Flon Industry, 35 dia.×1000 L) was cut and worked into the shape shown in FIG. 10. The Part A shown in FIG. 10 slides when pulled slightly by hand to create a space for the sample, and when it is released the pellet is sandwiched between the electrodes and thermocouples. Part A is fixed with a Teflon screw (PFA, Flon Industry, M6 flat small screw, pitch 1.0) with a heatproof temperature of 260° C. A thermocouple (Chino SUS K thermocouple 1SCHS 1-6 (needle tip), ϕD=1.0 mm) and electrode (stainless, tip worked into a needle tip) were inserted into one side of the pellet, and another thermocouple and electrode into the other side, with the pellet sandwiched in between. The conductive wires attached to each of the pair of electrodes were connected to an EZ Chrom (GL Science), and the potential difference was measured. An example of the measurement results are shown in FIG. 11.

Example 8

Power Generation Test of $LaFe_3Sr_3O_{10}$ Pellet

Figure 12:
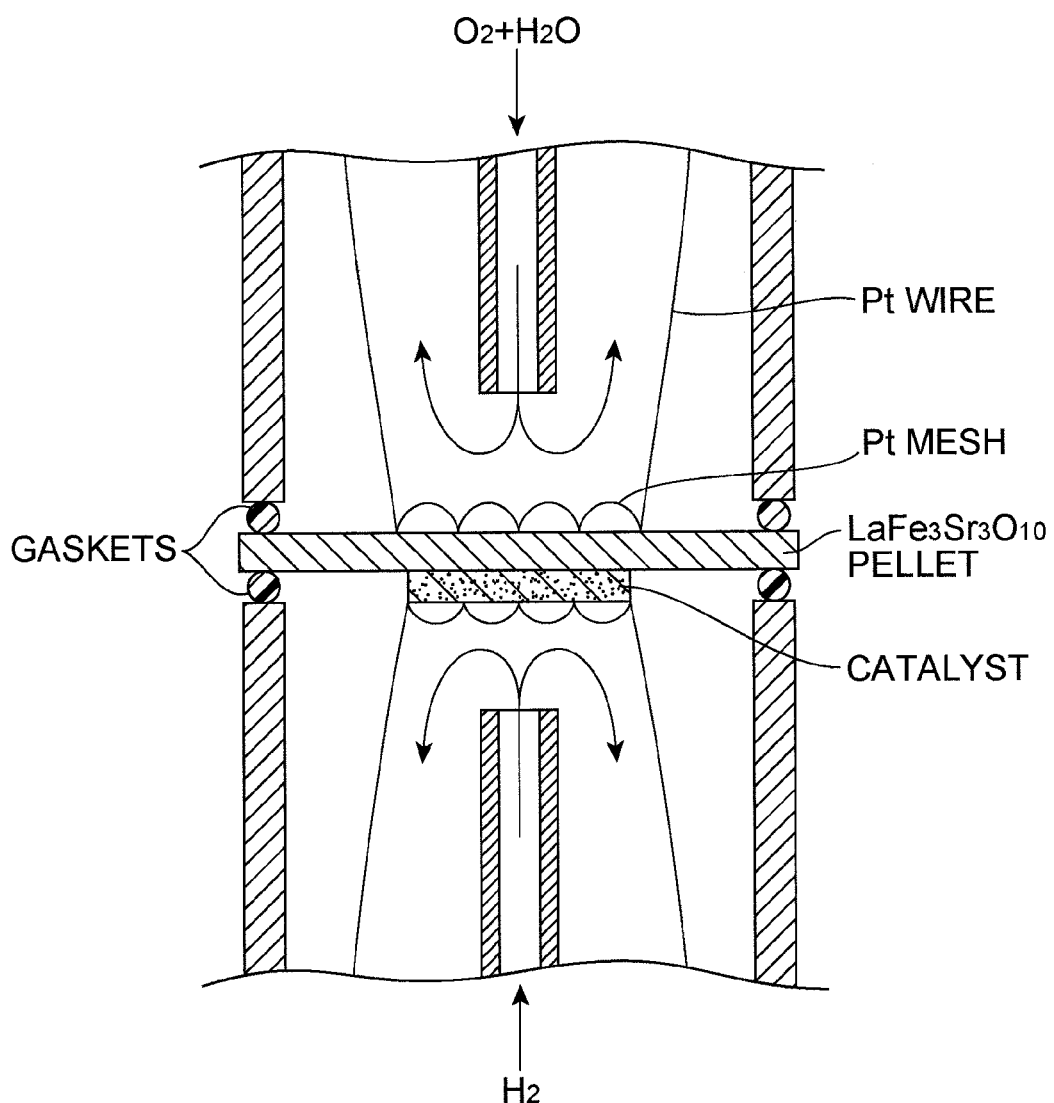
FIG. 12 is a model cross-section showing an evaluation device.

To evaluate the properties of a fuel cell of the configuration shown in FIG. 12, a disk-shaped $LaFe_3Sr_3O_{10}$ sintered pellet (dia. 20 mm, thickness 1 mm) was prepared. A catalyst layer (dia. 6 mm) was provided in the middle of one side of the $LaFe_3Sr_3O_{10}$ sintered pellet. 15 mass % Pd carried on $LaFe_3Sr_3O_{10}$ powder was used as the catalyst.

Figure 13:
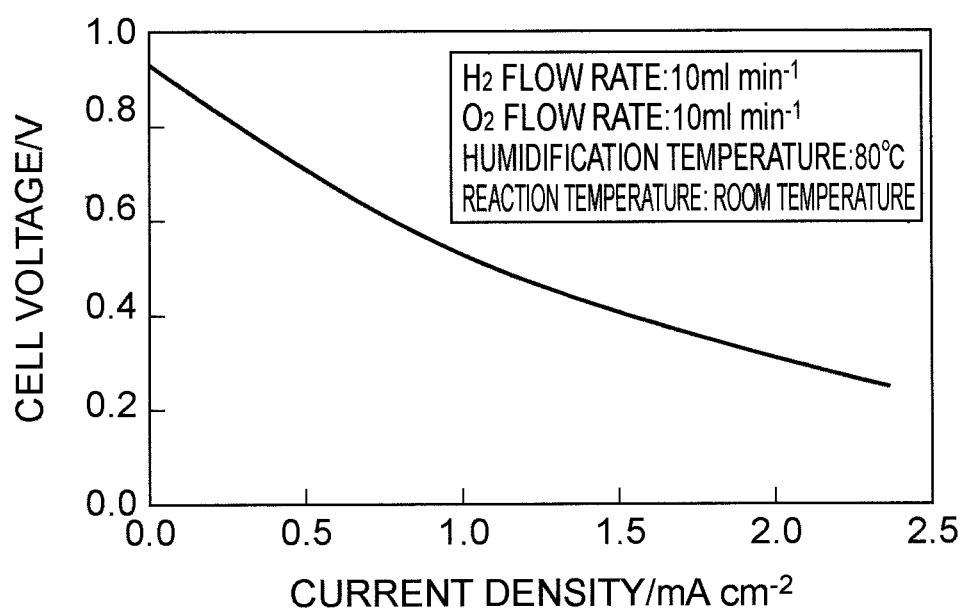
FIG. 13 is a graph showing the results for Example 8.

A sample prepared in this way was mounted in the evaluation device shown in FIG. 12, and evaluated. This device supplies hydrogen from below to the surface having the catalyst layer (anode). It also supplies humidified oxygen from above to the surface without the catalyst layer (cathode). Pt mesh was installed on the upper and lower surfaces of the $LaFe_3Sr_3O_{10}$ sintered body, and output from conductive wires (Pt wire) attached to these was measured. The measurement procedures were as follows. FIG. 13 shows one example of the measurement results.

(1) The sample was mounted in an evaluation device, and the pellet was hydrogen treated. Hydrogen treatment can be performed under conditions of hydrogen concentration 10 to 100 vol %, temperature 80 to 200° C., pressure 0.1 to 1 MPa, treatment time 2 to 48 hours, and conditions of hydrogen concentration 100 vol %, temperature 150° C., pressure 0.1 MPa, treatment time 3 hours of temperature elevation followed by 2 hours at 150° C. are especially desirable.

(2) After hydrogen treatment, the pellet was steam treated. Steam treatment can be performed under conditions of temperature 20 to 150° C., relative humidity 30 to 100%, pressure 0.1 to 1 MPa, treatment time 2 to 48 hours, and conditions of temperature 25° C. (room temperature), relative humidity 100%, pressure 0.1 MPa, treatment time 3 hours are especially desirable. Hydrogen hydrated at 80° C. was supplied at 10 mL/minute to the anode (catalyst surface), and oxygen hydrated at 80° C. was supplied at 10 mL/minute to the cathode (non-catalyst surface).

Example 9

Figure 14:
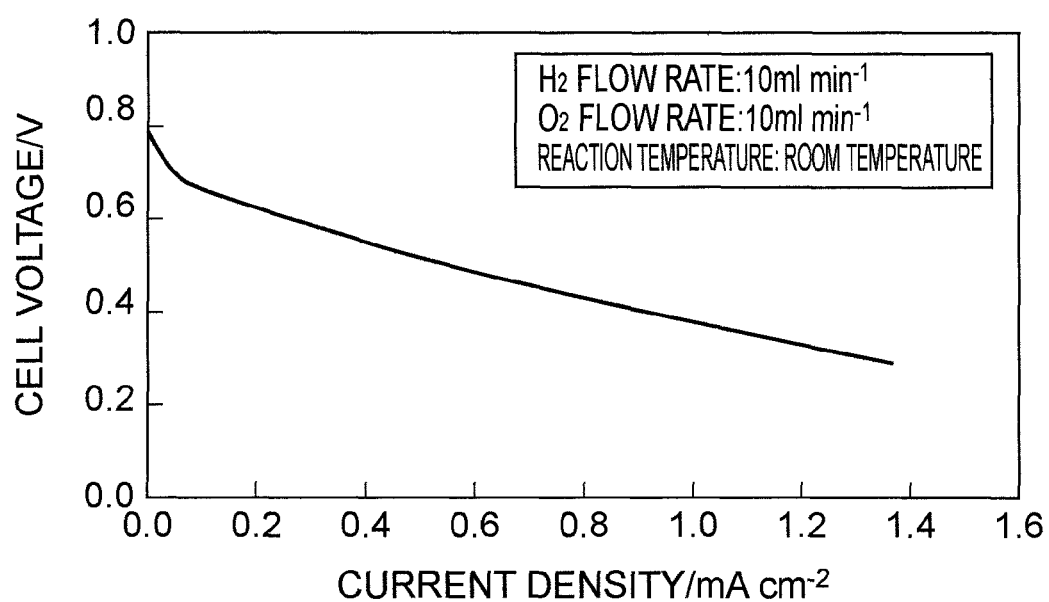
FIG. 14 is a graph showing the results for Example 9.

Electricity Generation Test of $Bi_4Sr_{14}Fe_{24}O_{56}$ Pellet Using Fuel Cell Both surfaces of the pellet were wetted, cathode gas ($O_2$) was supplied at 10 mL/minute and anode gas ($H_2$) at 10 mL/minute, and an electricity generation test was performed using a device similar to that shown in FIG. 12. One example of the measurement results is shown in FIG. 14.

Comparative Example 1

To evaluate the performance of a fuel cell when the $NaCO_2O_4$ pellet was not steam treated, a power generation test was performed as in Example 4 except without steam treatment. As a result, no potential was generated at a temperature range of 0 to 200° C.

Comparative Example 2

To evaluate the performance of a fuel cell using a non-layered metal oxide, an electricity generation test was performed as in Example 4 except that the electrolyte material was yttrium-stabilized zirconia (Tosoh Corp.) rather than $NaCO_2O_4$. No potential was generated as a result.

Thermogravimetric Analysis of $NaCO_2O_4$ Sample and $LaFe_3Sr_310_{10}$ Sample

Steam treatment was performed under the same conditions as in the electricity generation tests of the previous example, and the catalyst layers were peeled off the $NaCO_2O_4$ pellet and $LaFe_3Sr_3O_{10}$ pellet used in electricity generation to prepare a $NaCO_2O_4$ sample and $LaFe_3Sr_3O_{10}$ sample for thermogravimetric analysis. Weight changes in the samples were observed with a thermogravimeter (TG) as the temperature was raised from room temperature to 500° C. The results are shown in FIG. 15.

Figure 15:
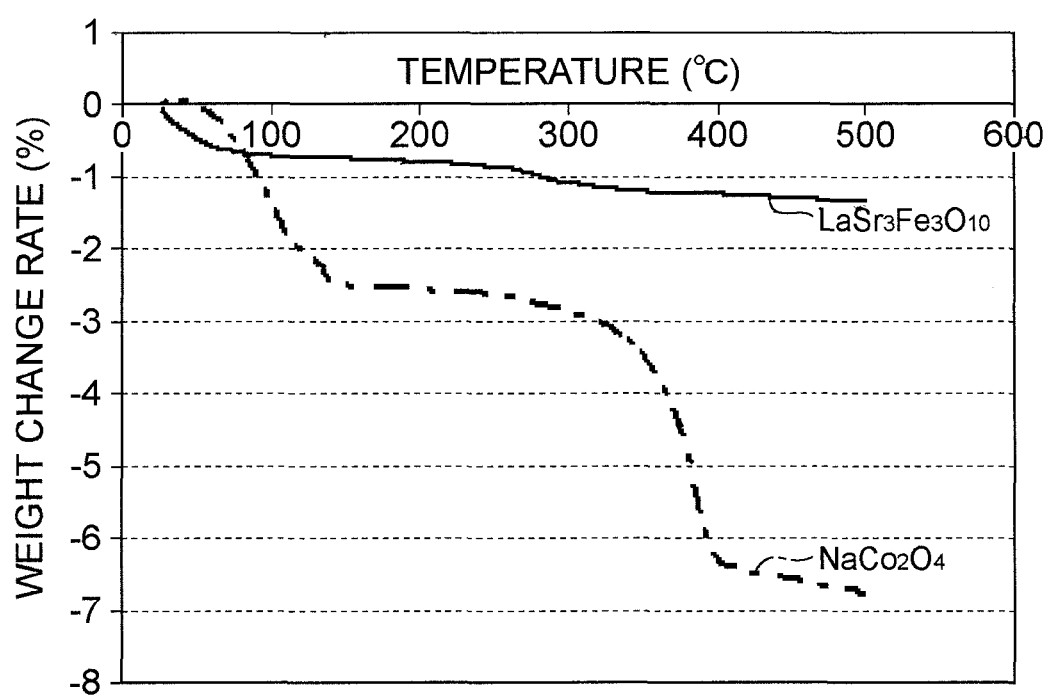
FIG. 15 is a graph showing the results of thermogravimetric analysis.

As shown in FIG. 15, both the $NaCO_2O_4$ sample and the $LaFe_3Sr_3O_{10}$ sample exhibited weight changes attributable to dissociation of OH groups in the layered oxides. That is, since it is thought that dissociation of OH groups in the layered oxides does not occur below 200° C., weight changes in the $NaCO_2O_4$ sample at 300 to 400° C. and weight changes in the $LaFe_3Sr_3O_{10}$ sample at around 300° C. can be attributed to dissociation of OH groups. Put another way, it can be said that OH groups included in the layered oxide as a result of steam treatment participate in conductivity in the form of hydroxide ions.

When fuel cells are prepared using these layered oxides as the electrolytes, the temperature range during electricity generation is preferably below the temperature at which weight loss due to dissociation of OH groups become more pronounced (see FIG. 15). Specifically, when a $NaCO_2O_4$ pellet is used as the fuel cell electrolyte, the temperature range is preferably 350° C. or less, or more preferably 300° C. or less. When a $LaFe_3Sr_3O_{10}$ pellet is used as the fuel cell electrolyte, the temperature range is preferably 300° C. or less, or more preferably 250° C. or less.

INDUSTRIAL APPLICABILITY

With the present invention is possible to obtain sufficiently strong electromotive force under low-temperature conditions such as room temperature without using poisonous chemicals or platinum.

REFERENCE SIGNS LIST

30 Fuel cell
31 Solid electrolyte layer
32 Anode
33 Cathode
35 Main cell body
35a Gas supply port (hydrogen supply means)
35c Gas supply port (oxygen supply means)
36a Pipe (hydrogen supply means)
36c Pipe (oxygen supply means)
R1 First region
R2 Second region

The invention claimed is:

1. An anion exchange-type fuel cell, comprising:
an electrolyte layer that has oxygen vacancies hydrated with water molecules, the electrolyte layer containing at least one layered metal oxide selected from the group consisting of $NaCo_2O_4$ and $LaFe_3Sr_3O_{10}$,
wherein an ion conductor of the fuel cell is a hydroxide ion (OH—), and
wherein the layered metal oxide includes OH groups, which dissociate in the layered metal oxide at higher than 200 degrees Celsius.

2. The fuel cell according to claim 1, wherein the fuel cell further comprising an anode and a cathode.

3. The fuel cell according to claim 1, wherein the fuel cell further comprising a catalyst layer containing Pd and the layered metal oxide.

4. The fuel cell according to claim 1, wherein the fuel cell further comprises a hydrogen supply and an oxygen supply.

5. An anion exchange-type fuel cell, comprising:
an electrolyte layer that has oxygen vacancies hydrated with water molecules, the electrolyte layer containing at least one layered metal oxide selected from the group consisting of $NaCo_2O_4$ and $LaFe_3Sr_3O_{10}$;

a main cell body the interior space of which is divided by the electrolyte layer into a first region and a second region;

an anode provided on the side of the first region of the electrolyte layer and having a catalyst layer containing Pd and the layered metal oxide;

a cathode provided on the side of the second region of the electrolyte layer;

a hydrogen supply for supplying hydrogen to the first region; and an oxygen supply for supplying oxygen together with moisture to the second region, wherein an ion conductor of the fuel cell is a hydroxide ion (OH—), and wherein the layered metal oxide includes OH groups, which dissociate in the layered metal oxide at higher than 200 degrees Celsius.

6. An electricity generation method using an anion exchange-type fuel cell that is provided with an electrolyte layer containing at least one layered metal oxide selected from the group consisting of $NaCo_2O_4$ and $LaFe_3Sr_3O_{10}$, a main cell body the interior space of which is divided by the electrolyte layer into a first region and a second region, an anode provided on the side of the first region of the electrolyte layer and having a catalyst layer containing Pd and the layered metal oxide, and a cathode provided on the side of the second region of the electrolyte layer, the electricity generation method comprising:

a step of hydrating oxygen vacancies in the layered metal oxide contained in the electrolyte layer with water molecules; and a step of supplying hydrogen to the first region and supplying oxygen together with moisture to the second region, wherein an ion conductor of the fuel cell is a hydroxide ion (OH—), wherein the layered metal oxide includes OH groups, which dissociate in the layered metal oxide at higher than 200 degrees Celsius, and wherein reactions represented by Formula (1) and (2) below are achieved in the anion exchange-type fuel cell operating at operating temperatures below 350 degrees Celsius $$2H_2 + 4OH^- \rightarrow 4H_2O + 4e^- \quad (1)$$

$$O_2 + 2H_2O + 4e^- \rightarrow 4OH^- \quad (2).$$

7. The electricity generation method according to claim 6, wherein the step of hydrating comprises steam treating the layered metal oxide.

8. The electricity generation method according to claim 7, wherein the temperature of the steam treating is within a range of 20-150 degrees Celsius.

9. The electricity generation method according to claim 6, wherein the operating temperature is within the range of 10-300 degrees Celsius.

10. The electricity generation method according to claim 6, wherein the operating temperature is within a range of 20-80 degrees Celsius.

11. The electricity generation method according to claim 6, wherein hydrogen is directly and/or externally supplied to the first region.

12. The electricity generation method according to claim 6, wherein oxygen together with moisture are directly and/or externally supplied to the second region.

13. The electricity generation method according to claim 6, wherein oxygen vacancies are hydrated with water molecules before electricity generation by fuel cell is initiated.

* * * * *